United States Patent
Shotey

(10) Patent No.: US 10,389,098 B2
(45) Date of Patent: Aug. 20, 2019

(54) SNAP-ON SCREWLESS WALLPLATE WIRING DEVICE

(71) Applicant: HUBBELL INCORPORATED, Shelton, CT (US)

(72) Inventor: Marcus J. Shotey, Scottsdale, AZ (US)

(73) Assignee: HUBBELL INCORPORATED, Shelton, CT (US)

( * ) Notice: Subject to any disclaimer, the term of this patent is extended or adjusted under 35 U.S.C. 154(b) by 18 days.

(21) Appl. No.: 15/640,657

(22) Filed: Jul. 3, 2017

(65) Prior Publication Data
US 2017/0365990 A1 Dec. 21, 2017

Related U.S. Application Data

(63) Continuation of application No. 14/139,045, filed on Dec. 23, 2013, now Pat. No. 9,698,584.

(60) Provisional application No. 61/745,741, filed on Dec. 24, 2012.

(51) Int. Cl.
| | |
|---|---|
| *H02G 3/14* | (2006.01) |
| *H01R 25/00* | (2006.01) |
| *H01R 13/74* | (2006.01) |
| *H01R 13/73* | (2006.01) |
| *H01R 13/447* | (2006.01) |

(52) U.S. Cl.
CPC ............. *H02G 3/14* (2013.01); *H01R 13/447* (2013.01); *H01R 13/73* (2013.01); *H01R 13/741* (2013.01); *H01R 25/006* (2013.01)

(58) Field of Classification Search
None
See application file for complete search history.

(56) References Cited

U.S. PATENT DOCUMENTS

| | | | | |
|---|---|---|---|---|
| 1,840,582 A | | 1/1932 | Hubbell | |
| 2,740,873 A | * | 4/1956 | Cronk | H02G 3/14 174/66 |
| 3,168,612 A | | 2/1965 | Sorenson | |
| 3,197,549 A | * | 7/1965 | Good | H02G 3/14 174/66 |
| 3,329,785 A | | 7/1967 | Baer et al. | |
| 3,663,919 A | | 5/1972 | Jaconette | |
| 3,987,928 A | | 10/1976 | Mori | |
| 4,211,905 A | | 7/1980 | Quigley | |
| 4,340,795 A | | 7/1982 | Arthur | |
| 4,500,746 A | * | 2/1985 | Meehan | H02G 3/12 174/503 |
| 4,609,119 A | * | 9/1986 | Richter, Sr. | H01R 13/745 200/295 |
| 4,631,354 A | | 12/1986 | Boteler | |
| 4,679,882 A | | 7/1987 | Mears | |

(Continued)

*Primary Examiner* — Dimary S Lopez Cruz
(74) *Attorney, Agent, or Firm* — Dickinson Wright PLLC

(57) ABSTRACT

A wall cover plate is provided for connecting directly to an electrical wiring device without the use of the base plate or adapter plate. The wall plate can have a connector such as a hook and/or prong that engages the housing for the mounting strap of the electrical wiring device. The electrical wiring device can include a removable connector attached to the mounting strap where the connector has at least one edge or coupling member for coupling with a faceplate. The faceplate can have an inner edge with a rib or series of teeth for connecting with the mounting strap or the removable connector by an interference fit.

22 Claims, 9 Drawing Sheets

(56) References Cited

U.S. PATENT DOCUMENTS

| | | | |
|---|---|---|---|
| 4,733,330 A | 3/1988 | Tanaka et al. | |
| 5,180,886 A | 1/1993 | Dierenbach et al. | |
| 5,189,259 A | 2/1993 | Carson et al. | |
| 5,484,309 A * | 1/1996 | Howard | H01R 13/506 |
| | | | 439/107 |
| 5,723,817 A | 3/1998 | Arenas et al. | |
| 5,863,016 A * | 1/1999 | Makwinski | H02G 3/14 |
| | | | 174/535 |
| 5,895,888 A | 4/1999 | Arenas et al. | |
| 5,900,584 A | 5/1999 | Cady et al. | |
| 6,329,596 B1 | 12/2001 | Justiniano et al. | |
| 6,441,304 B1 * | 8/2002 | Currier | H02G 3/14 |
| | | | 174/50 |
| 6,840,800 B2 | 1/2005 | Kidman | |
| 6,875,940 B2 | 4/2005 | Endres et al. | |
| 6,923,663 B2 | 8/2005 | Oddsen et al. | |
| 7,030,318 B2 | 4/2006 | Tufano et al. | |
| 7,030,319 B2 * | 4/2006 | Johnsen | H02G 3/14 |
| | | | 174/66 |
| 7,077,695 B2 | 7/2006 | Kidman | |
| 7,102,081 B2 | 9/2006 | Xu et al. | |
| 7,122,740 B2 | 10/2006 | Xu et al. | |
| D550,076 S | 9/2007 | Ni | |
| 7,282,642 B2 | 10/2007 | Schmieta et al. | |
| 7,285,723 B2 | 10/2007 | Lindenstraus et al. | |
| 7,306,482 B1 | 12/2007 | Kidman | |
| 7,622,676 B2 * | 11/2009 | Drane | H02G 3/14 |
| | | | 174/66 |
| 8,294,028 B2 | 10/2012 | Huang | |
| 8,371,465 B2 | 2/2013 | Denier | |
| 8,420,956 B2 | 4/2013 | Alderson et al. | |
| 8,592,681 B2 * | 11/2013 | Alderson | H01H 13/86 |
| | | | 174/66 |
| 8,853,893 B2 * | 10/2014 | Savicki, Jr. | H05B 33/0815 |
| | | | 200/339 |
| 2008/0006431 A1 | 1/2008 | Oddsen et al. | |
| 2011/0067896 A1 | 3/2011 | Baldwin et al. | |
| 2011/0147037 A1 * | 6/2011 | Tee | H02G 3/14 |
| | | | 174/66 |

* cited by examiner

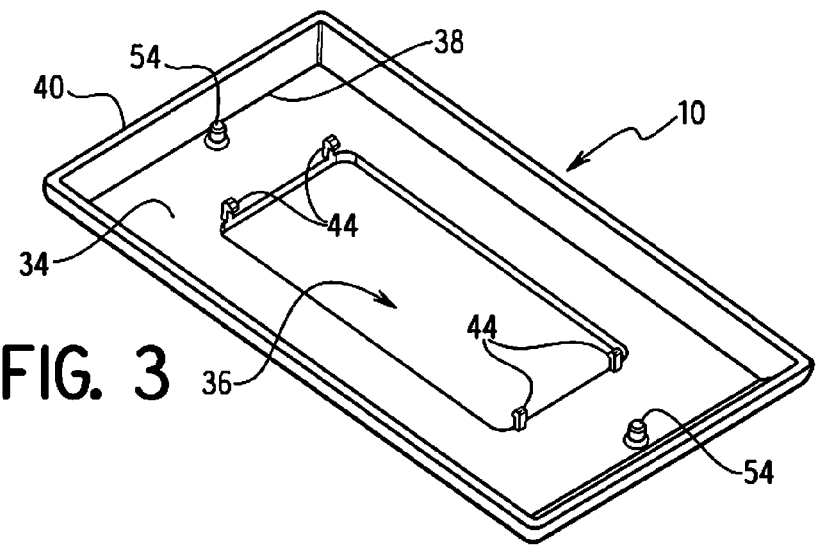
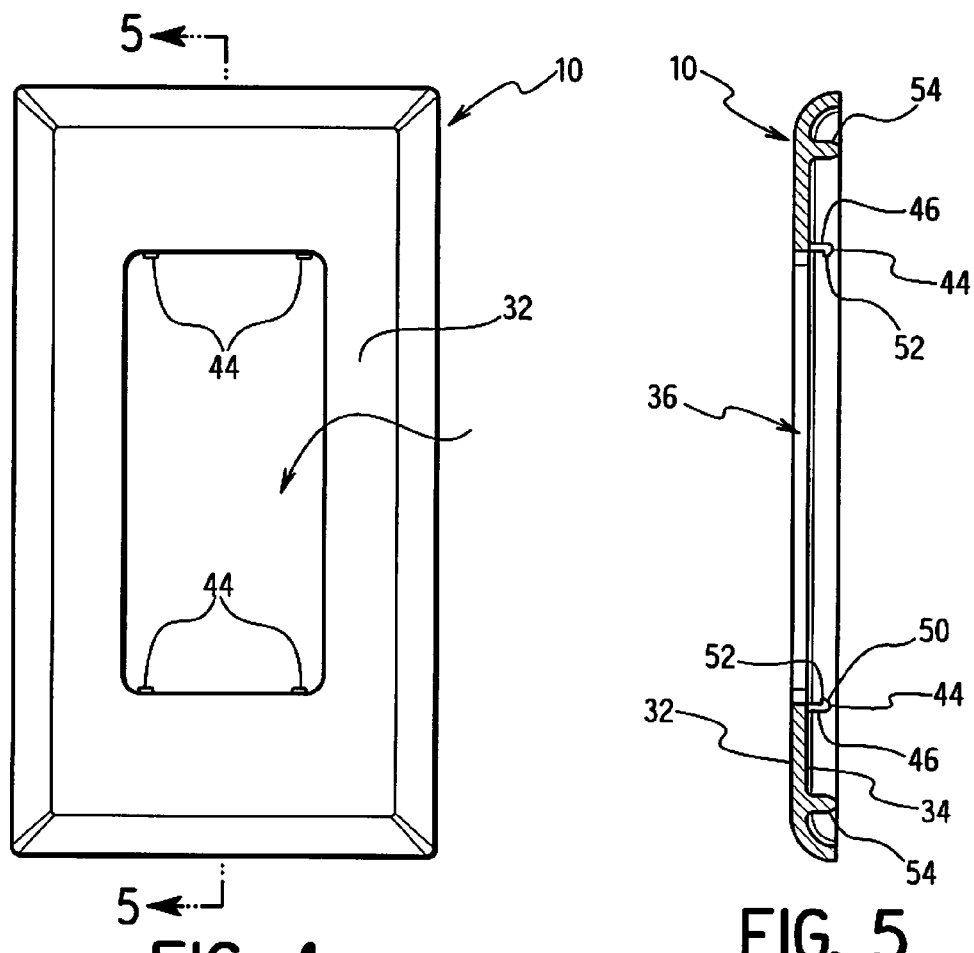
FIG. 3
FIG. 4
FIG. 5

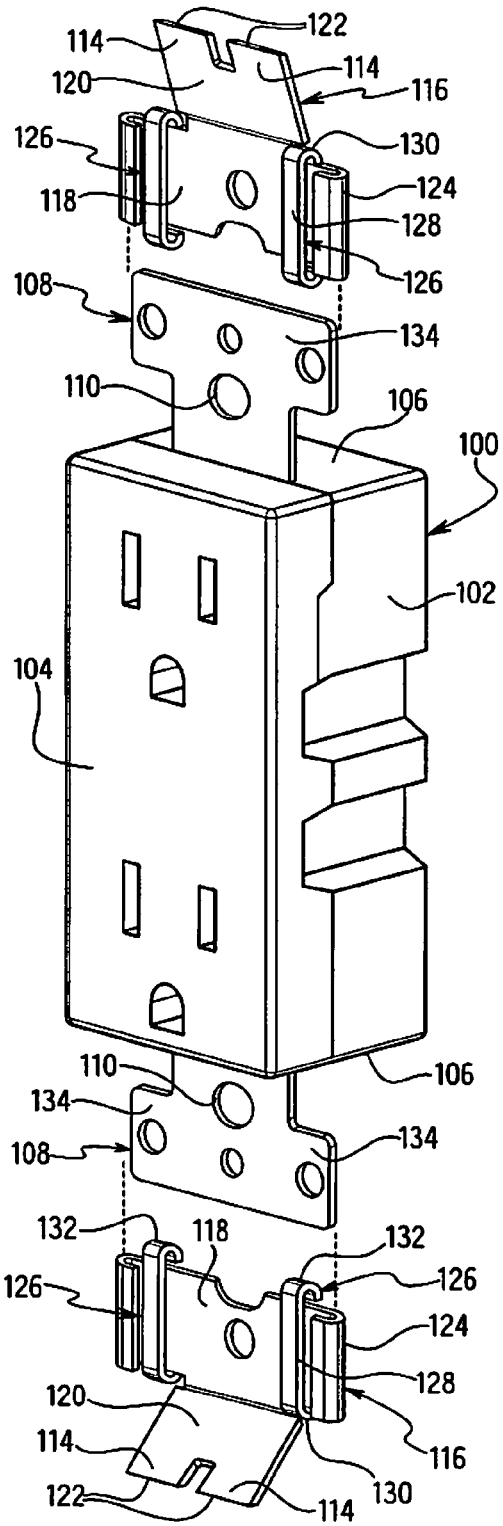
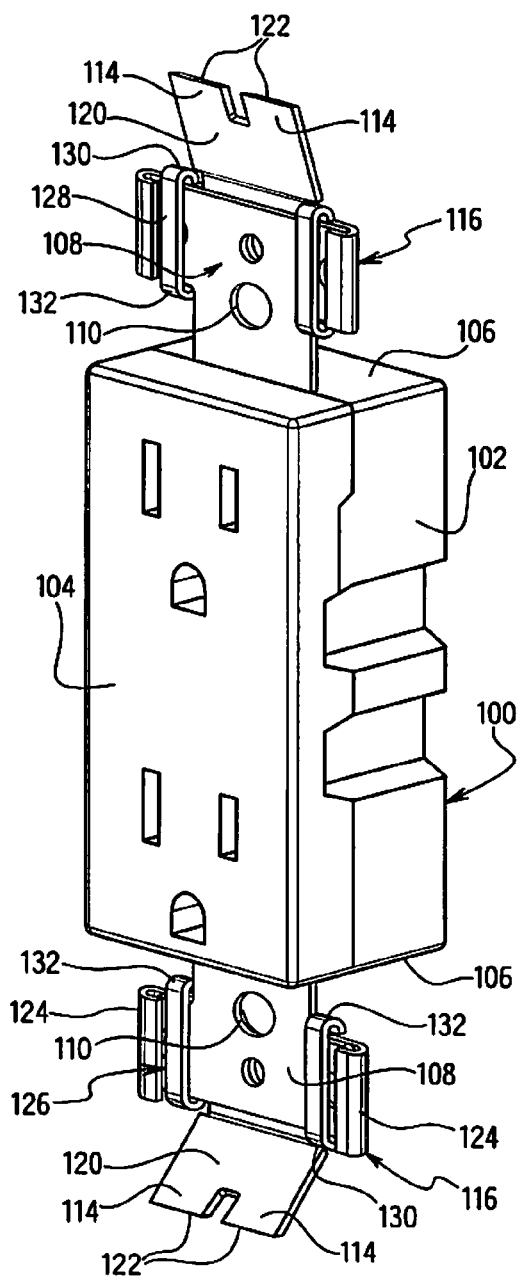
FIG. 11
FIG. 12

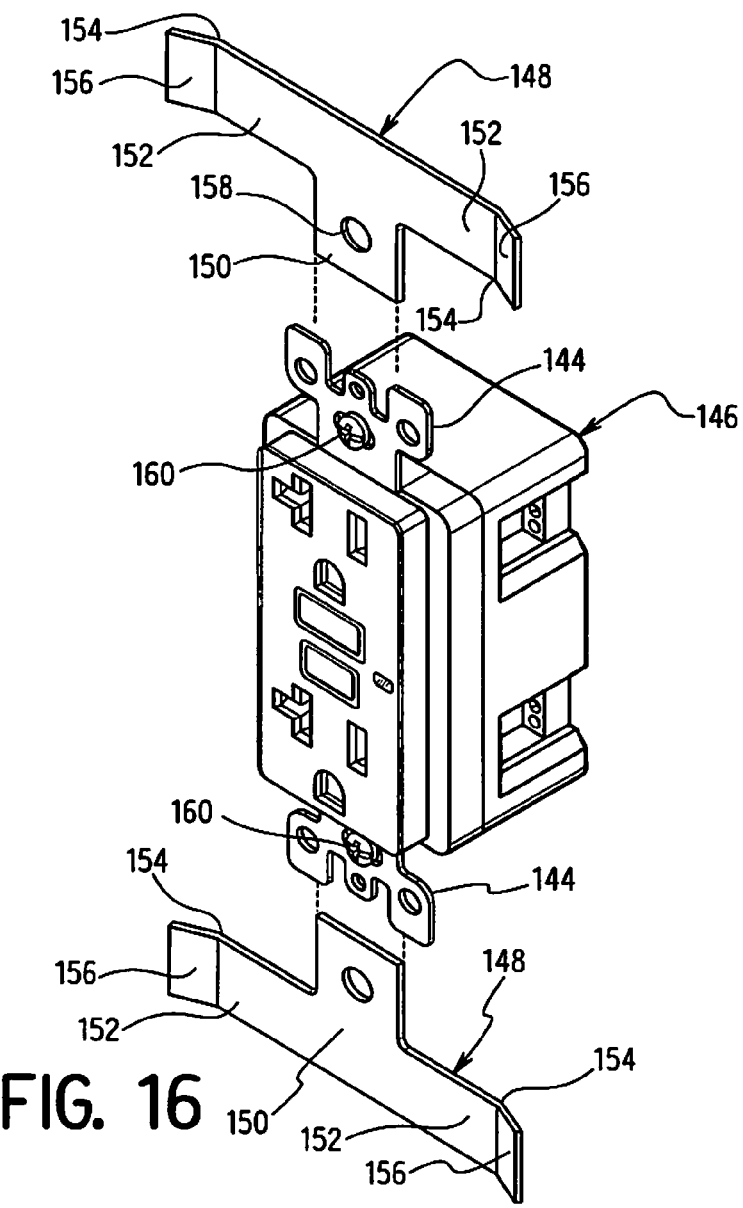
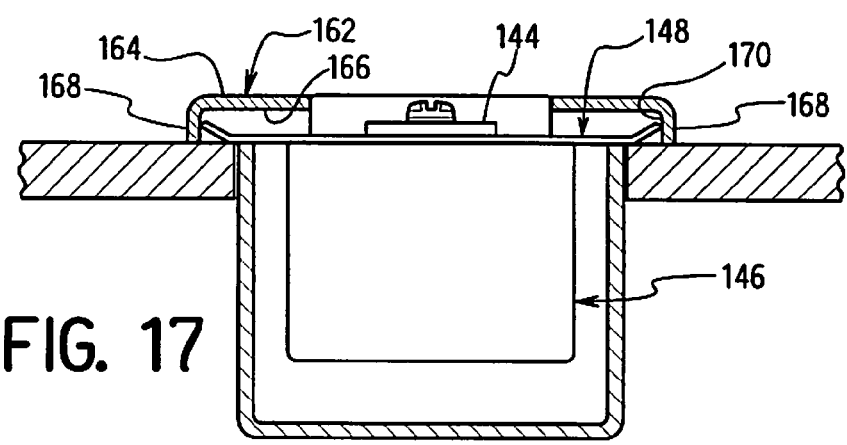

SNAP-ON SCREWLESS WALLPLATE WIRING DEVICE

This application is a divisional application of U.S. Ser. No. 14/139,045 filed Dec. 23, 2013, which claims priority to U.S. Provisional Application No. 61/745,741 filed Dec. 24, 2012 which are hereby incorporated by reference in their entirety.

FIELD OF THE INVENTION

The present invention is directed to a snap-on wall plate assembly for covering an electrical device and an electrical box opening mounted in a wall structure. The invention is particularly directed to a screw-less wall cover plate assembly that is able to attach to the electrical wiring device and to fit against the wall surface without the use of tools, screws or other visible fasteners.

BACKGROUND OF THE INVENTION

Electrical wiring devices are installed in various types of installations, for example, industrial, residential and commercial applications and settings. The appearance and safety of the electrical wiring device is greatly enhanced by the wall plate. The wall plates are typically connected to the wiring device by screws which may not provide the desired aesthetics depending on the intended use. The installation of the wall plate typically involves small screws that can be easily dropped or lost.

Wiring devices such as a switch or electrical receptacle are typically mounted in an electrical box which is in turn mounted to a wall stud or other support structure. The open end of the electrical box is usually mounted flush with the outer surface of the wall. A cover plate or face plate is attached to the electrical device to cover the open end of the electrical box and to provide a decorative appearance. Face plates are typically attached by one or more screws that extend through a screw hole in the face plate and are threaded into the electrical device.

Various face plates have been produced having no visible screws or fasteners on the outer surface. The face plates typically have a snap mechanism that enables the attachment of the face plate to an adapter plate or some intermediate plate that must be first attached to the wiring device. One example is disclosed in U.S. Pat. No. 5,723,817 to Arenas et al. This cover plate assembly is suitable for single gang or multi gang boxes. The device includes an attachment plate having a tab at each end. A face plate is snapped onto the tabs to attach the face plate to the attachment plate.

Another example of a faceplate attachment assembly is disclosed in U.S. Pat. No. 5,189,259 to Carson et al. The face plate assembly includes a mounting plate having a hook-like portion. A face plate is provided with legs that extend outwardly and attach to the hook portion of the attachment plate to attach the cover plate to the attachment plate.

Another example of an attachment mechanism is disclosed in U.S. Pat. No. 4,733,330 to Tanaka et al. This patent also discloses an attachment plate which is attached to an electrical box where the attachment plate has a hook-like member. A cover plate includes legs with a hooked end for hooking onto the attachment plate.

Various other arrangements have been developed for attaching a face plate to an electrical box. One type of arrangement includes spring-like members that can snap into a hole in a mounting plate or clamp onto the electrical box or opening in the wall. Examples of this type of device are disclosed in U.S. Pat. No. 1,840,582 to Hubbell, U.S. Pat. No. 3,168,612 to Sorenson, U.S. Pat. No. 3,197,549 to Good, U.S. Pat. No. 4,211,905 to Quigley, and U.S. Pat. No. 4,340,795 to Arthur.

Various other arrangements for attaching a face plate to an electrical box are disclosed in U.S. Pat. No. 3,987,928 to Mori, U.S. Pat. No. 4,631,354 to Boteler, and U.S. Pat. No. 5,180,886 to Dierenbach et al.

While the prior attachment mechanisms for attaching a face plate to a wall have generally been suitable for the intended purpose, there is a continuing need in the industry for improved attachment mechanisms for the face plate.

SUMMARY OF THE INVENTION

The present invention is directed to a wall plate assembly. In particular, the invention is directed to a snap-on wall plate assembly for attachment to an electrical device without the use of screws or other separate fasteners.

One aspect of the invention is to provide a cover wall plate assembly that is simple and easy to install and provides secure attachment of the wall plate to the electrical device without the use of screws. The wall plate assembly of the invention includes a wall plate that is attached directly to the electrical wiring device by a fastening member integrally formed with the wall plate. In one embodiment, an adapter is attached to the electrical wiring device for coupling with the wall plate.

Another aspect of the invention is to provide a wall plate assembly that is easy to manufacture and has a minimum number of parts and engagement components.

Another aspect of the invention is to provide a wall plate assembly where the wall plate can be attached to a multi-gang electrical box and is able to fit neatly against the wall surface and is able to compensate for uneven wall surfaces.

Another aspect of the invention is to provide a wall plate assembly where the wall plate includes an attachment member that can be attached directly to one or more surfaces of the electrical wiring device. The attachment members in one embodiment are integral with the wall plate and are positioned adjacent the central opening of the wall plate and extend from the rear face of wall plate to couple with a surface of the electrical wiring device.

The wall plate assembly in one embodiment of the invention includes at least one and preferably a plurality of hooks that extend from the rear face of the wall plate. The hooks engage a shoulder on an outer surface of the electrical wiring device to snap the wall plate directly to the electrical wiring device.

A further aspect of the invention is to provide a cover plate assembly where the electrical wiring device has a yoke or mounting strap with a flange having a lip that is able to engage an inner edge of the wall plate for coupling the wall plate to the electrical wiring device. The inner edge of the wall plate can have a plurality of teeth or ridges for engaging the edge of the mounting strap.

A further feature of the invention provides a removable spring clip adapter that can be attached to the ends of the mounting strap. The spring clip adapters have a coupling edge that engages the inner edge of the wall plate to attach the wall plate to the spring clip and the electrical wiring device.

These and other aspects of the invention are basically attained by providing a wall cover plate assembly for covering an electrical device mounted to an electrical box. The assembly comprises an electrical wiring device having a housing with a front face, a first longitudinal end with a mounting strap extending therefrom, and a second longitudinal end with a mounting strap extending therefrom for attaching the electrical wiring device to an open end of an electrical box. A wall plate is provided having a central opening with a dimension to receive the front face of the electrical wiring device, a front face and a rear face. A plurality of coupling members extend from the rear face and are coupled directly to the housing of the electrical wiring device.

The various aspects of the invention are also attained by providing a cover plate assembly for connecting to a wall mounted electrical device mounted in an electrical box. The assembly comprises an electrical wiring device having a housing with a front face, a first side wall, a second side wall, a first end wall having a mounting strap extending therefrom and a second end wall having a mounting strap extending therefrom for attaching the electrical wiring device to an electrical box. A wall plate has a front face, a rear face with a dimension to cover the electrical wiring device and the electrical box. The wall plate has a central opening with a dimension for receiving the front face of the electrical wiring device. A plurality of projections extend from the rear face of the wall plate. The projections have a distal end with a hook engaging at least one of the walls of the electrical wiring device. Two spaced apart prongs extend from the rear face of the wall plate and are spaced radially outward from the projections where the prongs have a dimension for frictionally engaging an aperture in the electrical wiring device.

The aspects of the invention are also attained by providing a cover plate assembly for a multi-gang wall mounted electrical box having a plurality of electrical devices. The assembly comprises an electrical wiring device having a housing with a front face, a first side wall, a second side wall, a first end wall having a mounting strap extending therefrom and a second end wall having a mounting strap extending therefrom for attaching the electrical wiring device to an electrical box. Two spaced apart coupling tabs extend from the mounting strap at the first end of the housing and two spaced apart coupling tabs extend from the mounting strap at the second end of the housing. A wall plate has a front face, a rear face, a dimension to cover the electrical wiring device, and a central opening with a dimension for receiving the front face of the electrical wiring device and defining a central axis of the wall plate. The wall plate has an outer edge with a lip extending substantially perpendicular to the front face and has an inner surface facing the central axis and has a plurality of teeth for engaging the coupling tabs to couple the wall plate to the mounting strap.

These and other aspects of the invention will become apparent from the following detailed description of the invention, which in conjunction with the annexed drawings, disclose various embodiments of the invention.

BRIEF DESCRIPTION OF THE DRAWINGS

The following is a brief description of the drawings in which:

FIG. 3 is a rear view of the cover plate of FIG. 1;

FIG. 4 is a front view of the cover plate of FIG. 1;

FIG. 5 is a cross-sectional view of the cover plate taken along line 5-5 of FIG. 4;

FIG. 11 is an exploded view showing the connector and the electrical wiring device in another embodiment of the invention;

FIG. 12 is a perspective view of the connector assembled on the electrical wiring device in the embodiment of FIG. 11;

FIG. 16 is an exploded view of a connector and electrical wiring device in a further embodiment of the invention;

FIG. 17 is a cross-sectional and view showing the wall plate attached to the connector;

DETAILED DESCRIPTION OF THE INVENTION

Figure 1:
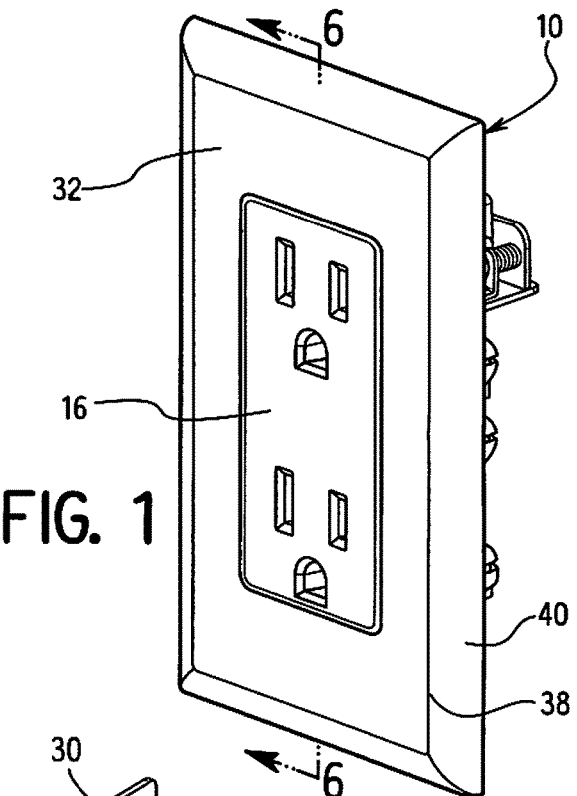
FIG. 1 is a front perspective view of the cover plate assembly in one embodiment of the invention attached to an electrical wiring device.

The present invention is directed to a wall plate assembly for attaching to an electrical wiring device such as an electrical receptacle or wall switch. The invention is particularly directed to a wall plate that is coupled to the housing of the electrical wiring device and/or to a mounting strap of an electrical wiring device.

Referring to the drawings, the wall cover plate 10 is coupled to an electrical wiring device 12 without the use of screws or separate fasteners. The electrical wiring device in the embodiment shown is a duplex receptacle. It will be understood that the electrical wiring device can be other wiring devices as known in the art such as a wall switch, GFCI, night light and the like.

The electrical wiring device 12 in the embodiment shown includes a housing 14 having a front face 16, first and second opposite side walls 18 and first and second end walls 20. A front face has suitable slots and apertures for receiving the prongs and blades of an electrical plug. A mounting strap 22 extends from each of the end walls 20 for mounting the electrical wiring device 12 to an electrical box in a conventional manner as known in the art. The mounting straps 22 are typically made of steel and form a ground strap for electrically grounding the electrical wiring device to the electrical box. In the embodiment illustrated, two separate mounting straps 22 are shown attached to the opposite end walls of the housing 14. In other embodiments, a single mounting strap can be provided that extends along the longitudinal length of the electrical wiring device 12 and extends from the end walls of the housing 14. The mounting strap can extend through the housing 14 or along the bottom side and ends as known in the art.

The mounting straps 22 have an outwardly extending flange 24 with at least one aperture 26 receiving a mounting screw 28 for attaching the electrical wiring device 12 to the electrical box. A second aperture 30 is formed in the flange 24 of the mounting strap 22 spaced from the aperture 26. In one embodiment of the invention, the aperture 30 is a threaded hole typically used for receiving a screw for mounting an attaching a conventional face plate to the electrical wiring device by a threaded screw.

The housing 14 of the electrical wiring device 12 includes a shoulder 42 formed in at least one of the walls of the housing 14 and preferably in at least two opposite walls as shown. In the embodiment shown, a shoulder 42 is formed in the end walls 20 and spaced from the front face 16 toward the rear face 17. The shoulder 42 forms a lip or undercut having a bottom face substantially parallel to the front face 16 and facing away from the front face.

The wall plate 10 as shown in FIGS. 3, 4 and 5 has a substantially planar configuration with a front face 32 and a rear face 34. The wall plate 10 in the embodiment shown has a substantially rectangular configuration for mating with a single gang electrical box and a single wiring device. In other embodiments, the wall plate 10 can have a dimension for a multi-gang electrical box.

The wall plate 10 has a central opening 36 extending between the front face 32 in the rear face 34. The central opening 36 has a dimension corresponding substantially to the dimensions and shape of the front face 16 of the electrical wiring device 12 so that the front face 16 is received in the central opening 36 as shown in FIG. 1. The wall plate 10 has an outer edge 38 forming a perimeter of the wall plate. In the embodiment shown, the outer edge 38 includes a lip 40 that extends away from the rear face 34 as shown in FIG. 5.

Figure 2:
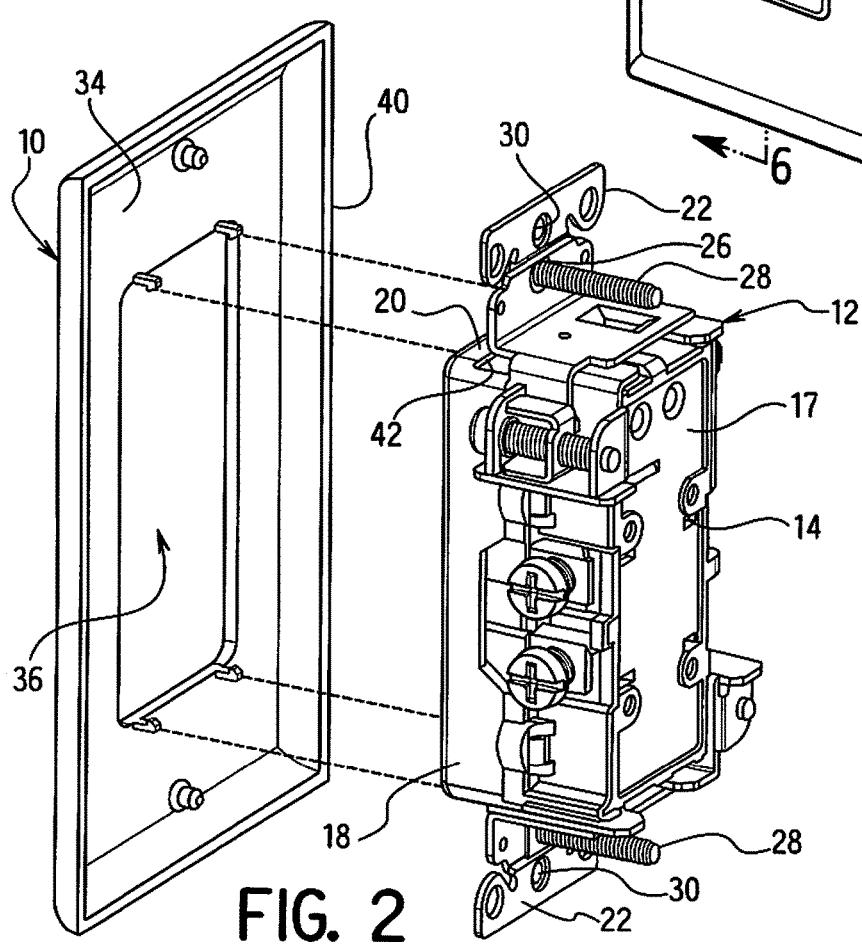
FIG. 2 is an exploded rear view of the cover plate assembly.

A plurality of coupling members extend from the rear face 34 of the wall plate 10 as shown in FIGS. 2 and 3 for coupling the wall plate to the electrical wiring device 12. The coupling members include at least one and preferably a plurality of projections 44 that extend outwardly from and substantially perpendicular to the rear face 34. In the embodiment shown, two projections 44 are provided on opposite ends for coupling to the electrical wiring device 12. Preferably at least four projections are provided on the wall plate and are positioned to couple with the electrical wiring device 12. The projections 44 extend substantially perpendicular to the plane of the wall plate and the rear face 34. The projections have a leg 46 extending from the rear wall 34 with a distal end 48 having an inclined end face 50 and a projecting hook 52. In the embodiment shown, the projections 44 are positioned adjacent the inner edge of the central opening 36 of the wall plate 10. As shown in FIGS. 4 and 5 the hooks 52 project inwardly into an axial passage defined by the central opening 36. In one embodiment, the wall plate 10 and the central opening 36 have a substantially rectangular configuration where the central opening has opposite side edges and opposite end edges corresponding to the longitudinal ends of the electrical wiring device.

The coupling members of the wall plate also include at least one prong and preferably two spaced apart prongs 54 positioned at opposite ends. The prongs 54 are spaced from the projections 44. In the embodiment shown, the prongs 54 are spaced outwardly from the projections 44 and the central opening 36 and are positioned along a centerline of the wall plate 10. Preferably, the prongs 54 are oriented with respect to the wall plate corresponding to the location of the screw holes in a conventional wall plate for aligning with the wall plate screw holes in the electrical wiring device 12.

Figure 6:
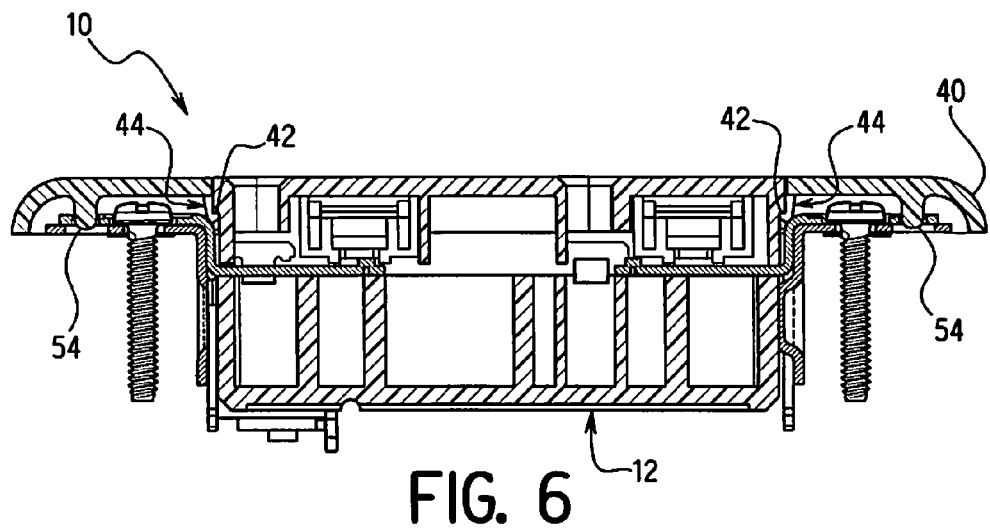
FIG. 6 is a cross-sectional view taken along line 6-6 of FIG. 1 of the cover plate showing the cover plate attached to the electrical wiring device.
Figure 7:
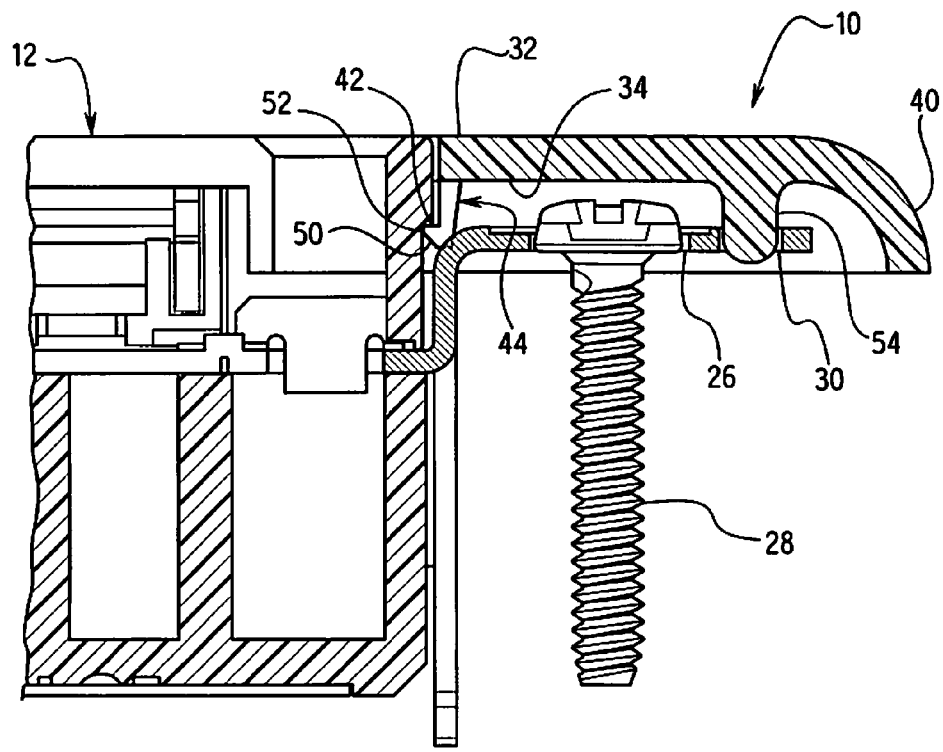
FIG. 7 is an enlarged partial cross-sectional view showing the attachment of the wall plate to the electrical wiring device.

In use, the electrical wiring device 12 is mounted in an electrical box in a conventional manner. The wall plate 10 is snapped onto the electrical wiring device as shown in FIGS. 6 and 7. The front face 16 of the electrical wiring device 12 is received in the central opening 36 so that the front face 32 of the wall plate 10 is substantially flush with the front face 16 of the electrical wiring device 12. The projections 44 engage the edge of the housing 14 of the electrical wiring device and slide along the sidewall until the hook 52 engages the shoulder 42 formed in the housing 14. In the embodiment shown, two projections 44 are provided at each longitudinal end of the central opening 36 in the wall plate 10 and engage a shoulder 42 formed in each end wall 20. In alternative embodiments, the shoulder 42 can be formed in the sidewalls and the projections 44 can be oriented along the longitudinal side edges of the central opening to engage the shoulder.

The prongs 54 as shown in FIGS. 6 and 7 are aligned with the threaded aperture 30 in the mounting strap 22 to align the wall plate 10 with the wiring device 12. The prongs 54 preferably have a dimension to frictionally engage the threaded aperture 30 to assist in coupling the wall plate 10 to the electrical wiring device 12. The projections 44 snap over the shoulder 42 to attach the wall plate to the electrical wiring device and the prongs 54 frictionally engages apertures 30 to couple the wall plate 10 to the electrical wiring device.

Figure 8:
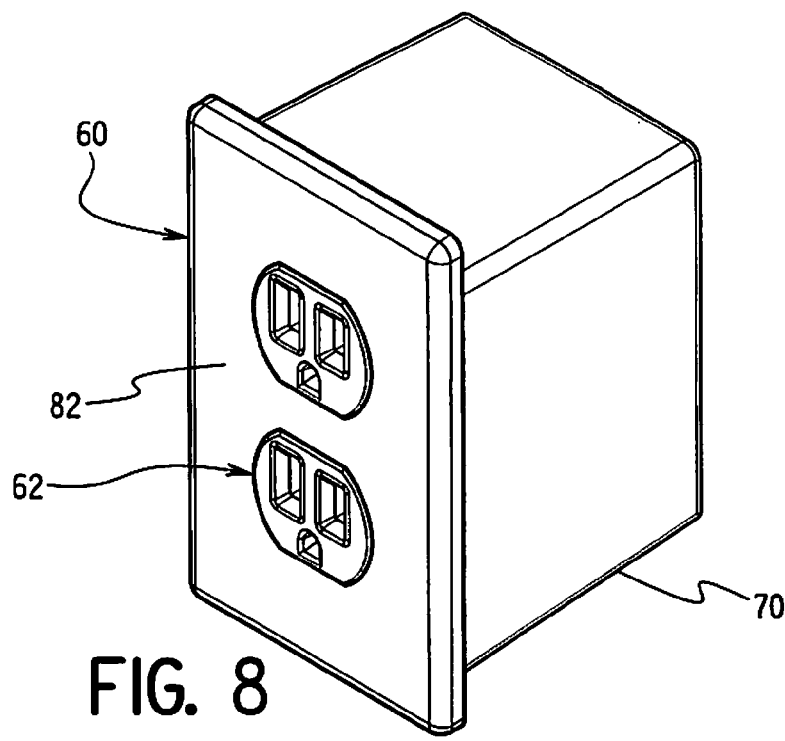
FIG. 8 is a perspective view of the wall plate assembly in a second embodiment of the invention.
Figure 9:
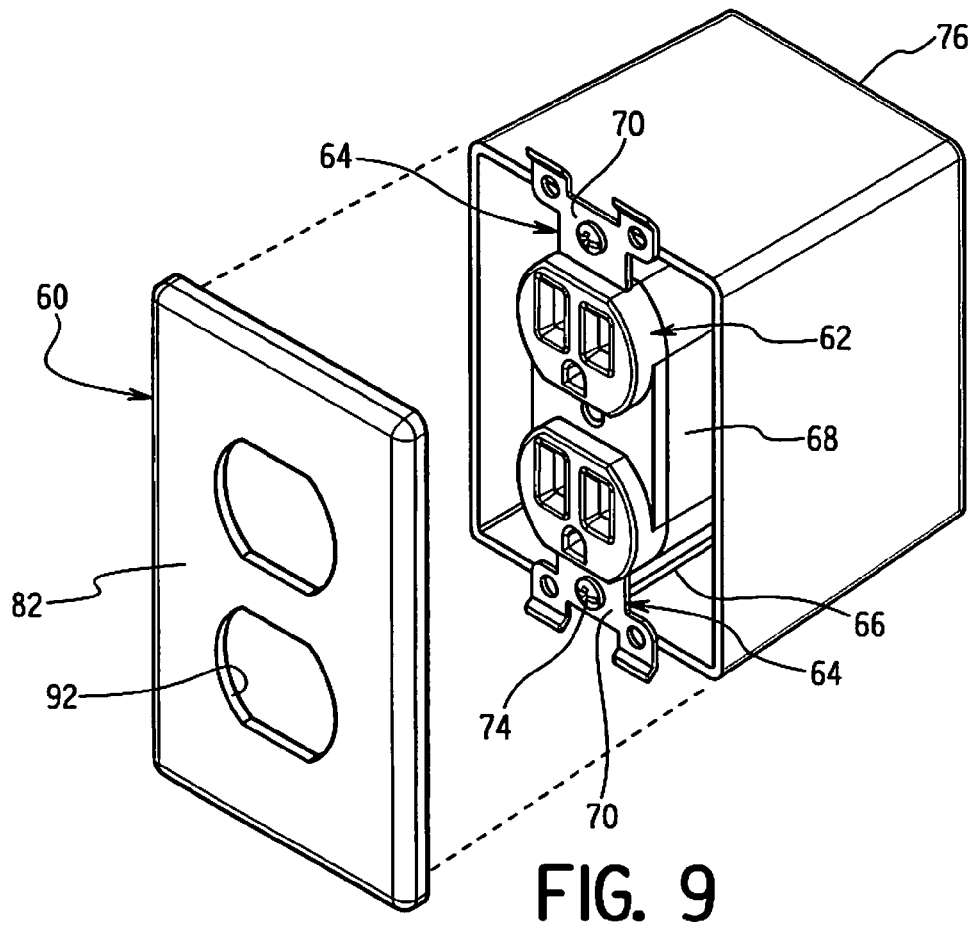
FIG. 9 is an exploded view of the wall plate and electrical wiring device.
Figure 10:
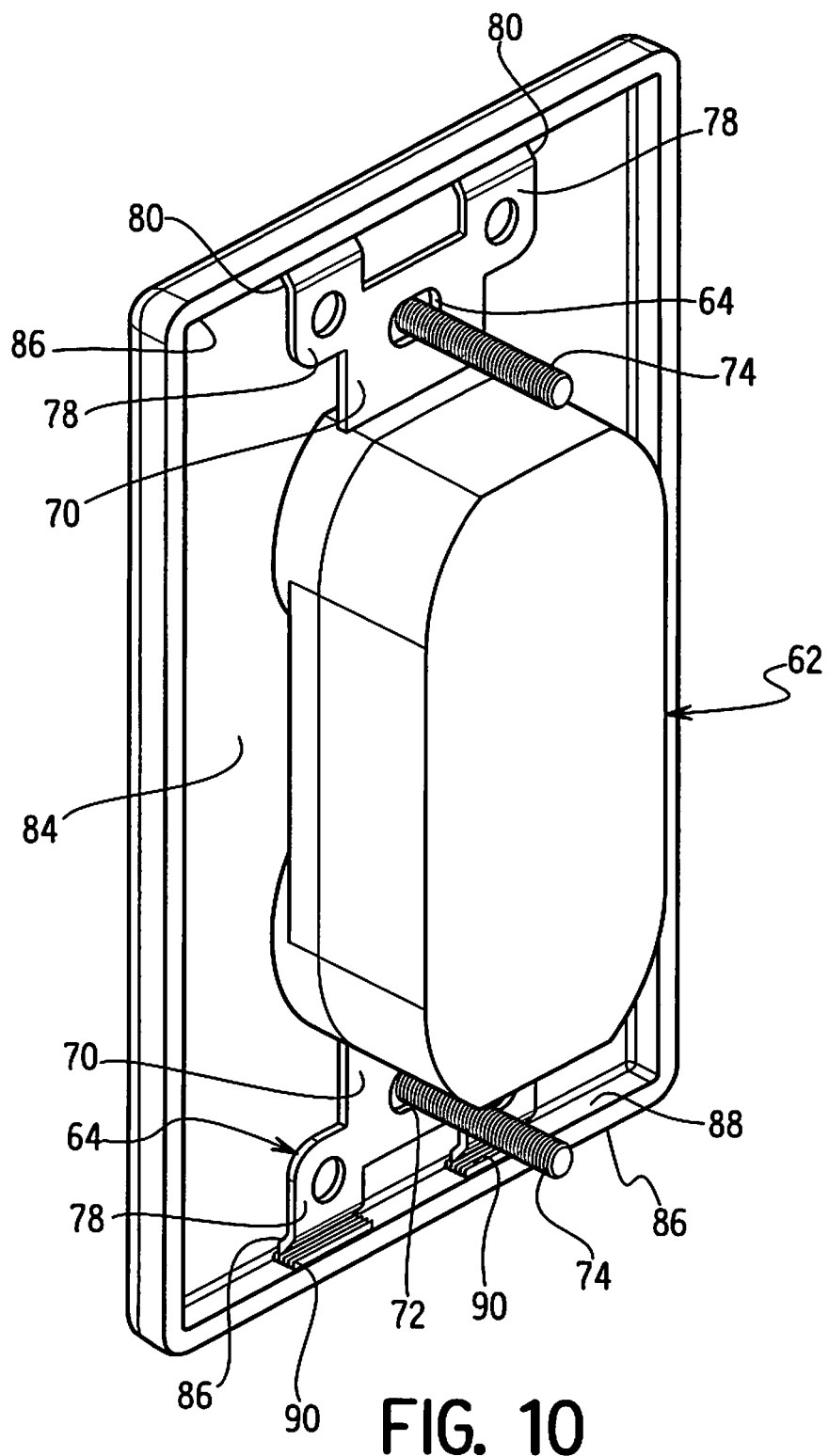
FIG. 10 is a rear view of the wall plate connected to the mounting strap of the electrical wiring device cross-sectional end view showing the connector of the cover plate engaging the base plate.
Figure 13:
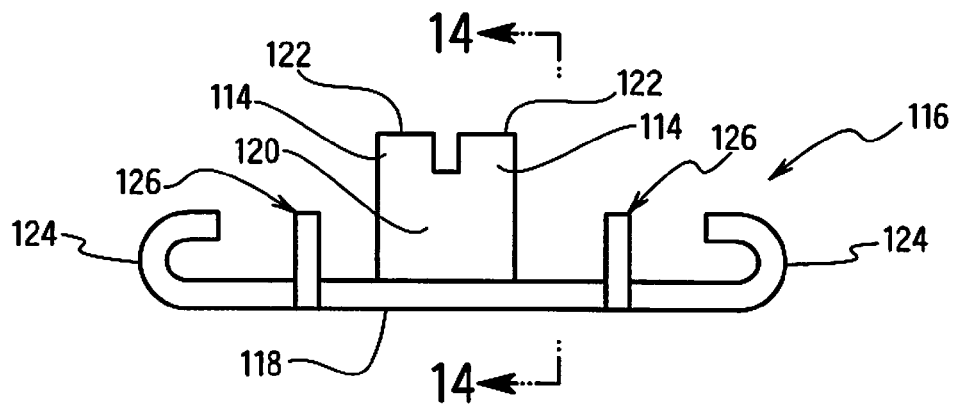
FIG. 13 is an end view of the connector of FIG. 11
Figure 14:
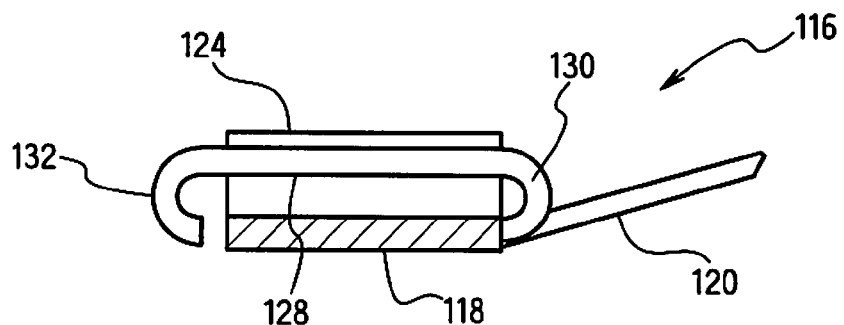
FIG. 14 is a cross-sectional view of the connector taken along line 14-14 of FIG. 13

FIGS. 8-10 illustrate a second embodiment of the invention for coupling a wall plate 60 to the electrical wiring device 62. The electrical wiring device 62 is illustrated as a duplex receptacle having a mounting strap 64 extending from each longitudinal end 66 of the housing 68 of the electrical wiring device 62.

Referring to FIGS. 9 and 10 the mounting strap 64 includes a planar body portion 70 extending outwardly from the housing 68 with an aperture 72 for receiving a mounting screw 74 for attaching to the electrical wiring device 62 to the electrical box 76. The mounting strap includes two spaced apart coupling tabs 78 forming a yoke that extend outwardly from the planar body portion 70. The coupling tabs 78 include an inclined coupling flange 80 forming a lip projecting away and outwardly with respect to the front face of the electrical wiring device.

The wall plate 60 has a front face 82 with openings 92 for the electrical device 62 with openings 92 for the electrical wiring device 62, a rear face 84 and a shoulder 86 encircling the outer edge of the wall plate 60. The shoulder 86 extends substantially perpendicular to the plane of the rear face 84 and includes an inner surface 88. The inner surface 88 includes a plurality of ridges forming teeth 90 to define a gripping surface for mating with the coupling flanges 80. The gripping surfaces defined by the teeth 90 are oriented with respect to the coupling flanges 80 as shown in FIG. 10. In use, the electrical wiring device 62 is mounted to the electrical box as shown in FIG. 9. The wall plate 60 is snapped onto the electrical wiring device 62 so that the coupling flanges 80 engage the gripping surface formed by the teeth 90.

In the embodiment shown, the mounting strap 64 at each longitudinal end of the housing 68 has two spaced apart coupling flanges 80 at the longitudinal ends of the electrical wiring device. Preferably the coupling flanges are spaced apart a distance to resist movement of the wall plate with respect to the electrical wiring device. The inner surface 88 is provided with teeth 90 oriented to engage the coupling flanges 80 to provide an interference fit of the wall plate with the mounting strap.

Figure 15:
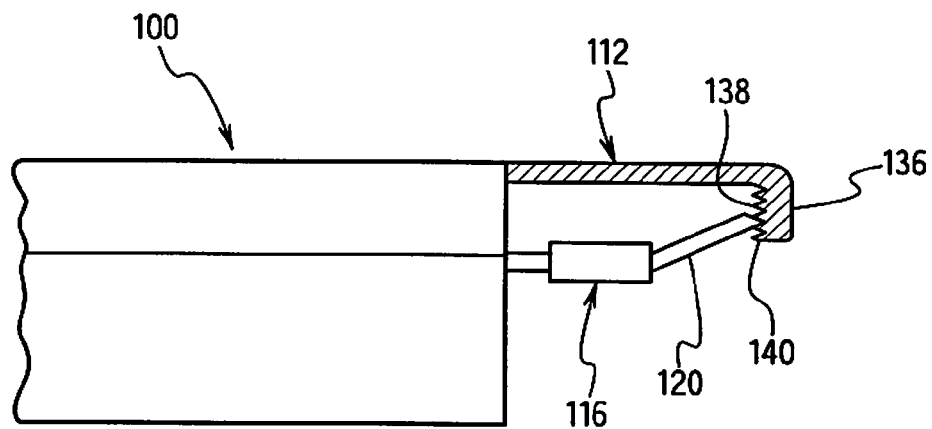
FIG. 15 is a partial side view in cross section showing the wall plate connected to the connector and the electrical wiring device of FIG. 11.

Referring to FIGS. 11-15 another embodiment of the invention is illustrated. In this embodiment, the electrical wiring device 100 includes a housing 102 with the front face 104 and longitudinal end faces 106. A mounting strap 108 extends from each end face 106 for mounting the electrical wiring device 100 to an electrical box. The mounting strap 108 includes one or more apertures 110 for receiving a mounting screw for attaching the electrical wiring device 100 to an electrical box. Each of the mounting straps 108 include two coupling flanges for coupling with the inner edge of a wall plate 112 as shown in FIG. 15 in a manner similar to the previous embodiment.

In the embodiment of FIGS. 11-15, coupling flanges 114 are integrally formed with an adapter 116 that can be removably attached to the mounting strap 108. The adapter 116 includes a body portion 118 and a leg portion 120 that is inclined with respect to the body portion 118 as shown in FIG. 11. The leg portion 120 is integrally formed with the coupling flanges 114. Preferably, two coupling flanges 114 are provided on each of the adapters 116 and are spaced apart from each other. In one embodiment, the coupling flanges are substantially parallel to each other. The outer edges 122 of the coupling flanges 114 form a gripping edge for mating with the wall plate. Preferably the adapter 116 is removably coupled to the mounting strap by a suitable faster.

The adapter 116 in the embodiment shown is formed with a substantially U-shaped guides 124 forming channels on opposite sides of the body 118. The U-shaped guides 124 are spaced apart a distance to receive the side edges of the mounting strap 108 so that the adapter 116 can slide onto the mounting strap 108. In the embodiment shown, a clip 126 is integrally formed with the body 118. The clip 126 has a leg portion 128 aligned substantially parallel to the body 118 and is connected to the body 118 by a U-shaped connecting portion 130. The distal end of the leg 128 includes a U-shaped hook 132.

In use, the adapter 116 slides onto the end of the mounting strap 108 with the guides 24 engaging the outer edges of the mounting strap 108. The clip 126 slides over the edge of the mounting strap 108 until the U-shaped hook 132 slides over the bottom edge of the arms 134 of the mounting strap 108 to secure the adapter 116 to the mounting strap. In alternative embodiments the U-shaped guides can be crimped by use of a suitable tool to attach the adapter to the mounting flange. As in the previous embodiment, the wall plate 112 has a shoulder 136 with an inner face 140 having a plurality of teeth 138 forming a gripping surface. The wall plate 112 is pressed onto the adapters 116 so that the coupling flanges 114 engage the teeth 138 for securing the wall plate to the electrical device.

FIGS. 16 and 17 illustrate another embodiment of the invention where the mounting straps 144 of the electrical wiring device 146 include an adapter 148. In this embodiment, the adapter 148 includes a body portion 150 with outwardly extending arms 152. The outer ends 154 of the arms 152 include an outwardly turned coupling flange formed at an incline with respect to the plane of the arms 152. The body 150 includes an aperture 158 for receiving the mounting screw 160. The mounting screw 160 extends through an aperture in the mounting strap 144 for mounting the electrical wiring device to an electrical box. In this embodiment of the invention, the mounting screw 160 passes through the aperture 154 coupling the adapter 148 to the mounting strap.

The adapter 148 can be positioned on the top face of the mounting strap or on the bottom face of the mounting strap as shown so that the adapters are captured between the mounting strap and the electrical box. The coupling flanges 156 are spaced outwardly from the longitudinal sides of the electrical wiring device and the edges of the electrical box corresponding to the width of the wall plate 162. Preferably, the coupling flanges extend in opposite directions from the body 150 and engage opposite sides of the wall plate 162. In one embodiment as shown, the adapter 148 has a width so that the ends of the arms 152 extend outwardly a distance to contact opposite sides of the front edge of the electrical box as shown in FIG. 17. The arms 152 contacting the front edge of the electrical box prevent the arms from deflecting inwardly when the installation force is applied to the wall plate.

The wall plate 162 as in the previous embodiments has a front face 164, a rear face 166 and a shoulder 168 with an inner face 170 having a plurality of teeth or other gripping surface. As shown in FIG. 17, the coupling flanges 156 slide over the inner face 170 on opposite sides of the wall plate 162 for attaching the wall plate directly to the electrical wiring device.

Figure 18:
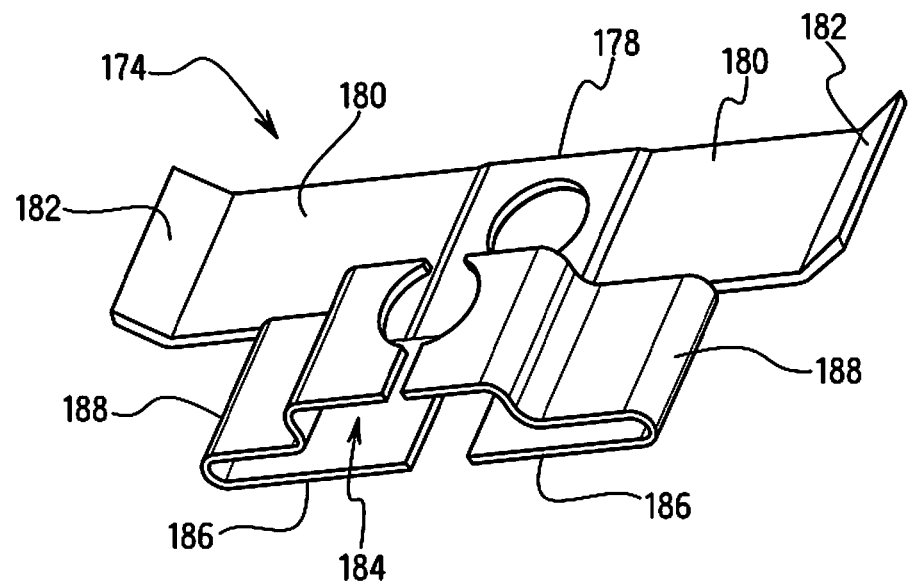
FIG. 18 is another embodiment of the connector for attaching to the mounting strap of an electrical wiring device.
Figure 19:
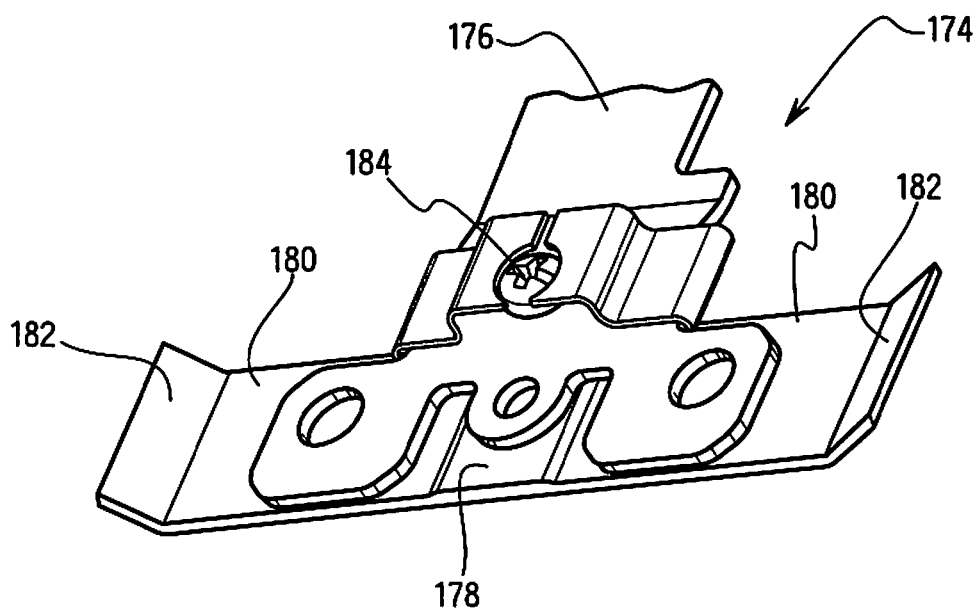
FIG. 19 is a partial perspective view showing the connector of FIG. 18 attached to the mounting strap of electrical wiring device.

FIGS. 18 and 19 illustrated another embodiment of an adapter 174 for coupling to the ends of a mounting strap 176 in a manner similar to the previous embodiment. In this embodiment, the adapter 174 has a body 178 with outwardly extending legs 180 having inclined coupling flanges 182 similar to the previous embodiment. The arms can have a length to contact the opposite edges of the electrical box as in the previous embodiment to resist deflection of the arms during installation of the wall plate. The adapter 174 includes a coupling member 184 for coupling the adapter to the mounting strap 176. The coupling member 184 includes legs 26 overlying the body 176 and connected to the body by U-shaped connecting portion. In one embodiment, the coupling member can slide over the end on the mounting strap. In other embodiments, the legs of the coupling members can be folded and bent around the mounting strap to fix the adapter to the mounting straps. The coupling flanges 182 extend outwardly from the sides of the electrical wiring device as shown in FIG. 19 for engaging the edges of the wall cover as shown in the embodiment of FIG. 17.

In one embodiment the electrical wiring device is a conventional duplex receptacle having a standard mounting strap or yoke. The adapter of the invention can be removably attached to the mounting strap as in the previous embodiments. In one embodiment, the wall plate and the adapter can be provided as a kit or assembly so that the wall plate can be attached to a conventional or existing electrical wiring device by attaching the adapter to the existing electrical wiring device without the need to modify the electrical wiring device. In one embodiment, the adapter can be attached directly to the mounting strap of the existing wiring device without the need to remove the electrical wiring device for modify the mounting strap.

While various embodiments have been chosen to illustrate the invention, it will be understood by those skilled in the art that various changes and modifications can be made without departing from the scope of the invention as defined in the appended claims.

What is claimed is:

1. An electrical assembly comprising:
an electrical wiring device having a housing with a from face, a first side wall, a second side wall, a first end wall, a second end wall, a first mounting strap extending from said first end wall and a second mounting strap extending from said second end wall for attaching said electrical wiring device to an electrical box, said housing having an inwardly extending shoulder with respect to an outer surface of said housing and spaced from said front face; and
a face plate for coupling to said electrical wiring device, said face plate having a front face, a rear face, and a central opening configured to receive said front face of said electrical wiring device, said face plate having a plurality of projections extending from said rear face and configured for coupling with said inwardly extending shoulder of said housing of said electrical wiring device.

2. The electrical assembly of claim 1, wherein said plurality of projections are oriented next to said central opening, and spaced inwardly from a peripheral outer edge of said face plate.

3. The electrical assembly of claim 2, wherein said shoulder of said electrical wiring device comprises a first undercut on said first end wall of said electrical wiring device and a second undercut on said second end wall of said electrical wiring device.

4. The electrical assembly of claim 3, wherein said central opening has a first side edge, a second side edge, a first end edge, and second end edge, and where said projections are provided at said first end edge and said second end edge.

5. The electrical assembly of claim 4 wherein said projections have a leg extending from said rear face of said face plate, and a hook at a distal end of said kg and projecting inwardly toward a respective end wall of said electrical wiring device for engaging said shoulder, and where said shoulder is provided on said first end wall and said second end-and wall of said housing.

6. The electrical assembly of claim 5, wherein said hooks project into an axial passage defined by said central opening of said face plate.

7. The electrical assembly of claim 1, where said first mounting strap and second mounting strap have a first aperture oriented for receiving a mourning screw for coupling said electrical wiring device to an electrical box, and a second aperture spaced from said first aperture; and
said face plate includes a plurality of prongs extending from said rear face and configured for mating with a respective second aperture of said first mounting strap and said second mounting strap.

8. The electrical assembly of claim 7, wherein said prongs are coupled to said second aperture by a friction fit.

9. The electrical assembly of claim 1, wherein said face plate has a substantially planar configuration.

10. The electrical assembly of claim 9, wherein said central opening extends between said front face and said rear face.

11. The electrical assembly of claim 1, wherein said face plate has a peripheral edge, and said central opening defines an inner edge of said face plate, and where said rear face extends between said peripheral outer edge and said inner edge.

12. The electrical assembly of claim 1, wherein said projections project inwardly with respect to said central opening.

13. The electrical assembly of claim 12, wherein said projections have a hook projecting inwardly with respect to said central opening for engaging said shoulder.

14. An electrical assembly comprising:
an electrical wiring device having a housing with a front face, a first side wall, a second side wall, a first end wall, a second end wall, a first mounting strap extending from said first end wall and a second mounting strap extending from said second end wall for attaching said electrical wiring device to an electrical box, and an inwardly extending shoulder on said housing spaced from said front face; and
a face plate for coupling to said electrical wiring device, said face plate having a front face, a rear face, arid a central opening configured to receive said front face of said electrical wiring device, said face plate having a plurality of projections extending from said rear face, said projections having a leg extending from said rear face and a hook extending from a distal end of said leg, said hook projecting into an axial passage defined by said central opening and configured for coupling with said shoulder of said housing of said electrical wiring device.

15. The electrical assembly of claim 14, wherein said central opening has a first side edge, a second side edge, a first end edge, and second end edge, and where said projections are provided at said first end edge and said second end edge.

16. The electrical assembly of claim 14, wherein said plurality of projections are oriented next to said central opening.

17. The electrical assembly 14, wherein said first mounting strap and second mounting strap have a first aperture oriented for receiving a mounting screw for coupling said electrical wiring device to an electrical box, and a second aperture spaced from said first aperture; and
said face plate includes a plurality of prongs extending from said rear face and configured for mating with said second aperture.

18. The electrical assembly of claim 17, wherein each of said prongs is coupled to a respective second aperture by a friction fit.

19. The electrical assembly of claim 14, wherein said shoulder of said electrical wiring device comprises a first undercut on said first end wall of said electrical wiring device and a second undercut on said second end wall of said electrical wiring device.

20. An electrical assembly comprising:
an electrical wiring device having a housing with a front face, an outwardly facing wall, a first mounting strap extending from a first end of said housing and a second mounting strap extending from a second end of said housing for attaching said electrical wiring device to an electrical box, said outwardly facing wall of said housing having a shoulder extending inwardly relative to said outwardly facing wall and extending between said front face and said rear face; and
a face plate for coupling to said electrical wiring device, said face plate having a front face, a rear face, a peripheral outer edge and inner edge forming a central opening configured to receive said front face of said electrical wiring device, said face plate having a plurality of projections extending from said rear face and having an inwardly projecting portion configured for coupling with said shoulder of said housing of said electrical wiring device.

21. The electrical assembly of claim 20, wherein said outwardly facing wall of said housing has a first end wall, a second end wall, a first side wall, and a second side wall, each of said wall extending between said front face and said rear face of said housing.

22. The electrical assembly of claim 21, wherein said inwardly projecting portion of said projection is a hook projecting inwardly with respect to said central opening.

\* \* \* \* \*